June 5, 1956   R. W. FOSTER   2,748,902
BRAKE SHOE
Filed Aug. 25, 1952
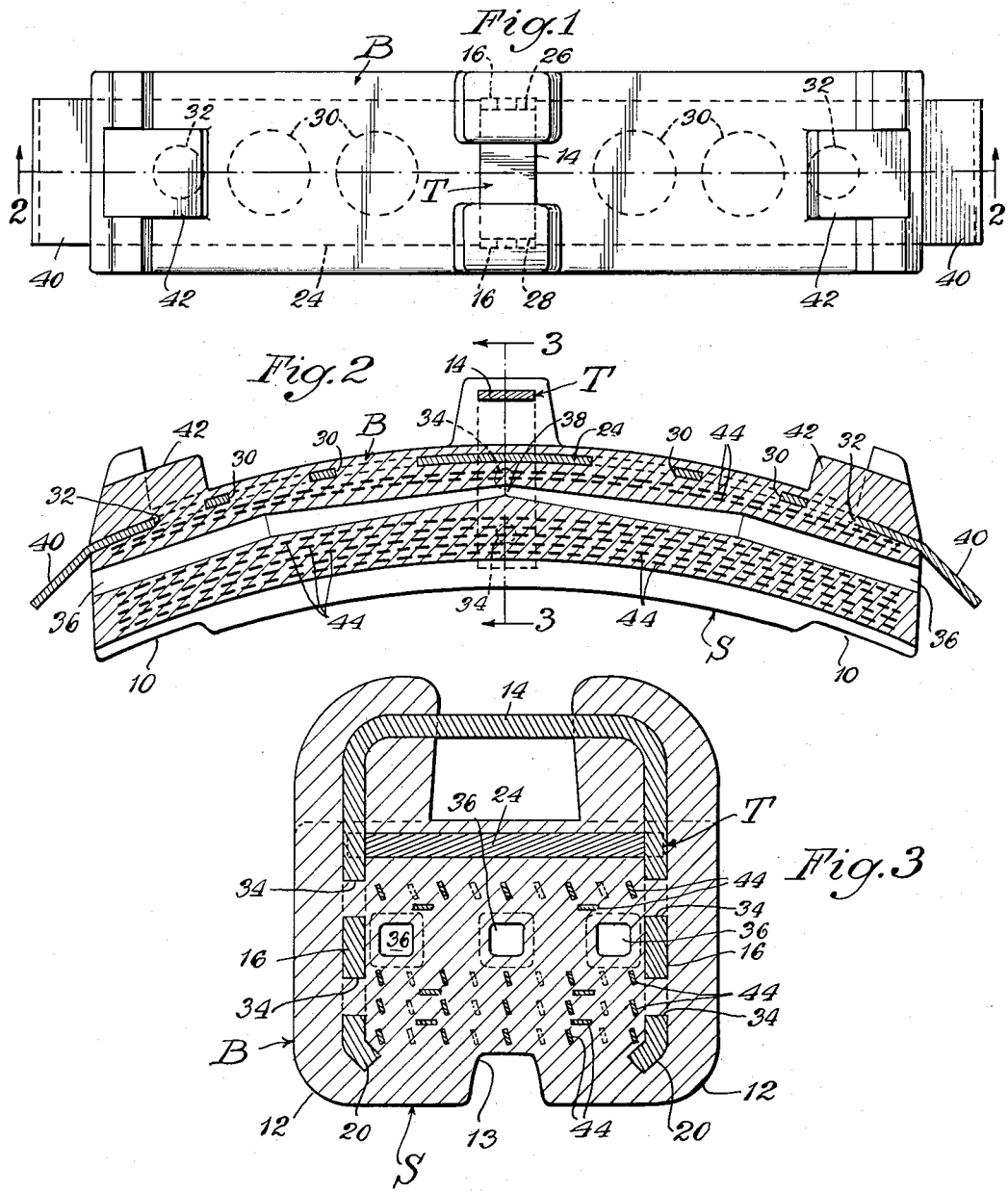
Inventor
Robert W. Foster
by Parker & Carter
Attorneys

United States Patent Office 2,748,902
Patented June 5, 1956

2,748,902
BRAKE SHOE
Robert W. Foster, Sullivan, Ind.

Application August 25, 1952, Serial No. 306,104

4 Claims. (Cl. 188—258)

My invention resides in the field of brake shoes, primarily brake shoes used by the railroad industry, and has for its primary object a new and improved brake shoe constructed in a new manner so as to overcome numerous difficulties during manufacture and casting, to obviate various defects in brake shoes while in use on the railroads, and to minimize other well-known shortcomings of conventional brake shoes. Therefore, the primary object of my invention is a particular brake shoe structure which has a much longer life than any other brake shoe known at the present time.

Another object of my invention is a brake shoe construction whereby if a crack appears at either end of the shoe, the broken end will not be allowed to fall but will remain in place and performs its normal breaking action as though no crack were present.

Another object of my invention is to consolidate internal supporting structure of a brake shoe and the bracket by which the shoe is mounted so that after the casting operation these elements become an integral unitary structure by which the brake shoe is simultaneously reinforced and properly mounted.

Other objects will appear from time to time in the ensuing specification and drawings in which:

Figure 1 is a plan view of my new and improved brake shoe;

Figure 2 is a sectional view taken along line 2—2 of Figure 1; and

Figure 3 is a sectional view of my brake shoe taken along line 3—3 of Figure 2.

My brake shoe is composed of primarily a brake shoe body B, a wheel contacting surface S, and a bracket or supporting structure T. The wheel contacting surface is arcuate in form and is provided adjacent the ends of the brake shoe with a pair of recesses 10 which aid in properly positioning and centering the brake shoe when it is brought into engagement with the wheel. I have found that if these recesses are not provided so that the arcuate portion of the contacting surface continues across the entire face of the brake shoe, the shoe will have a tendency to hunt or unevenly contact the wheel so that one end of the brake shoe will wear much more rapidly than the other. In Figure 3 the face of the brake shoe is rounded at its corners at 12 so that the brake shoe when in engagement with the wheel will have less tendency to create thermal cracks in the flange of the wheel. This feature adds substantially to the life of the wheel. The contacting surface is provided with an elongated groove or slot 13 which extends the entire length of the shoe. Although I have shown this groove as straight, it should be understood that any desirable configuration can be given to it, such as a serpentine or sinuous contour.

Intermediate the ends of the brake shoe a supporting bracket 14 is positioned across the lengthwise center line of the brake shoe. This bracket has a pair of parallel legs which extend the length of the side of the shoe to a point slightly removed from the brake shoe contacting surface S, the legs 16 terminating each in a turned-in portion or toe such as at 20. A supporting plate 24 is positioned in the body of the brake shoe and is arcuate in form so as to generally conform to the arcuate formation of the over-all brake shoe. The plate 24 is symmetrically disposed, as in Figure 2, on each side of the bracket 14 and as shown in Figure 3, passes between the legs 16. The plate 24 has approximately the same width as the distance between the outside edges of the bracket legs 16, and the supporting plate 24 is notched or reduced in width at 26 and 28 in Figure 1, so that the legs 16 pass by the outside edges of the supporting plate 24 toward their toe portions 20. The notches 26 and 28 formed in the edges of the plate are equidistant between the ends of the plate and each notch has approximately the same dimensions as the cross section of the legs 16 so that the legs fit snugly into these notches and firmly engage the supporting plate 24 as shown in Figure 3. It should be understood that the legs could be welded to the plate at this point.

In Figure 1 the supporting plate 24 is shown as having four large openings 30 which are symmetrically disposed on each side of the plate's center line at the bracket 14. Each of these holes 30 is approximately 1½" in diameter; however, this is only a recommended size and is considered not critical so that the holes 30 may vary slightly from this figure without impairing my inventive concept. Another hole 32 is positioned in the plate 24 beyond the holes 30 toward the end of the plate, one at each end. These holes 32 as shown in Figure 1, are approximately ⅞" in diameter and as shown are substantially smaller than the holes 30, however, I have found that the diameter of ⅞" is not critical and that this figure may be varied slightly without impairing the over-all strength of the shoe or departing from my inventive concept. It should be noted that the two extreme holes 32 in the plate 24 are smaller in diameter than the four holes 30 residing therebetween. During the casting operation the metal of the shoe rises approximately ⅛" above the surface of the plate 24 so as to fully cover the same. The legs 16 of the bracket 14 are provided with a plurality of holes 34 which are appropriately spaced between the portion of the leg that contacts the supporting plate 24 and the toe 20. Each of these holes are approximately ¼" in diameter and as shown in Figure 3, I have used two holes on each leg. However, the diameter of the holes is by no means critical nor should it be understood that the use of two holes in each of the legs of the bracket is a necessary or indispensable feature as the number of holes employed in the legs can be varied without departing from the inventive theme.

To properly cool the brake shoe I provide a plurality of cast tubes 36 which extend longitudinally the full length of the brake shoe and are generally arcuate in form, shown in Figure 2, to conform to the over-all bodily configuration of the shoe. As shown in Figure 3, I have used three of these cast tubes; however, it should be understood that any number of these tubes may be used which will prove satisfactory and perform the necessary cooling function desired in a shoe of this nature. Each of these tubes 36 is uniform in cross section for an extended portion adjacent the ends of the brake shoe, and toward the middle of the brake shoe the cross section uniformly reduces to a neck portion at 38 which is located approximately on the center line of the shoe within the confines of the bracket legs 16 as shown in Figure 3. Thus each of the tubes 36 is formed as a venturi which serves to cool the overall brake shoe. I have found that by the use of a venturi or reduced section in the tube 36 instead of a continuously cross section tube, I derive an increased cooling effect which is not present in a tube that has the same cross section throughout. The use, function, operation and theory behind my improved cooling effect derived from the use of a venturi tube is adequately disclosed and covered in my co-pending application, Ser. No. 190,970, filed October 19, 1950, and this feature will not be alluded to except generally hereinafter.

The supporting plate 24 is provided with a pair of extensions as at 40 which extend beyond the ends of the brake shoe and cover the entrance and exit to the tubes 36. In this manner the extensions 40 form scoops or air directing means by which air will be directed down through the tubes 36.

The shoe is additionally provided with a pair of raised lugs 42 at either end on the upper surface which produce a balancing effect for the shoe when it is positioned in its hanger adjacent the wheels in addition to substantially strengthening it.

In addition to the supporting plate 24 the brake shoe is additionally provided with an internal reinforcing structure which consists of a plurality of layers of wire mesh. As shown in Figure 3, these layers of mesh take on the form of expanded metal and I provide a total of seven layers horizontally disposed under the plate 24. The layers of mesh are disposed on both sides of the tubes 36, and as shown in Figure 3, I provide two layers of mesh between the tubes 36 and the plate 24 and five layers of mesh between the tubes 36 and the surface of the brake shoe S. The layers of mesh are disposed so that every other layer is positioned at right angles with respect to the adjacent layers. In Figure 3, top to bottom, layers 1, 3, 5, and 7 are positioned so that the pattern in the mesh runs longitudinally along the shoe; whereas layers 2, 4, and 6 are positioned so that their pattern runs transversely. While I have shown and described the mesh as being expanded metal it should be understood that a large number of wire meshes exist which would be completely satisfactory and I do not wish to be limited to the use of expanded metal only.

I have also shown all of the layers of mesh as being disposed in a horizontal plane; however, it should be understood that the mesh can be vertically disposed with one or more layers of mesh passing vertically between the adjacent tubes 36 and with one or more layers of the mesh passing vertically outboard of the two outside tubes 36 adjacent the legs 16 of the bracket 14.

All of the layers of mesh 44 as shown by the dotted line in Figure 2 extend to within approximately ¼" of the end of the shoe. Note that the shoe will be strengthened and reinforced throughout the entire length.

The use, operation and function of my invention are as follows:

The brake shoe will be appropriately suspended adjacent the wheel by the bracket 14 as shown in Figure 3 and the contacting surfaces S in arcuate form will be appropriately positioned adjacent the circular surface of the wheel. During the movement of the shoe, the extensions 40 on plate 24 constitute air scoop and will force air down through the cooling tubes 36.

The connection and integration of the bracket 14, by which the brake shoe is suspended, with the internal supporting structure of the brake shoe is a very important point of my invention as this connection, in the past, is the point at which the cracks and breaks in the shoe most frequently occur. To overcome the difficulties involved in the cracking and breaking of the shoe at the mid-point, the legs of the bracket 14 have been extended through properly sized notches in the supporting plate 24 and around the internal supporting mesh 44. The lower end of each of the legs is provided with a toe portion which is turned under so as to properly support, confine and enclose the various layers of wire mesh. The suitably sized holes 34 are drilled through the legs of the bracket so that during subsequent casting operations the metal that makes up the brake shoe will flow in, around and freely through the legs of the shoe as well as through the mesh. By the use of these holes in the legs of the bracket, all of the layers of mesh in the middle of the brake shoe and the bracket in effect become one integral unit, and as the legs of the bracket have been fitted snugly in the precisely sized notches in each side of the supporting plate 24, this supporting plate is included in this integral structure and the net effect of these features is that the supporting structure and the reinforcing plate and internal reinforcing structure become one integral compact unitary structure at a point midway between each end of the shoe.

While I have shown and described my device in reference to a preferred form of the embodiment, it should be understood that this is only one form of the invention and numerous modifications, changes and alterations can be made in the design as shown without departing from the fundamental theme, and I do not wish to be limited to the precise features. It should be readily apparent to one skilled in the art that changes and substitutions can be made in my composite brake shoe structure without departing from the essential features as set forth in the appended claims.

I claim:

1. In a brake shoe structure, a brake shoe body, a supporting means therefor comprising a generally U-shaped bracket with a pair of depending legs mounted intermediate the ends of said body, a supporting plate within and extending the full length of the brake shoe body and adjacent the upper edge so as to pass between the legs of the bracket, said plate being provided with a pair of notches intermediate its ends between the legs of the bracket, each notch having approximately the same dimensions as a cross section of a bracket leg so that the legs of the bracket pass through and snugly fit in the notches in the plate, and reinforcing means extending the full length of the brake shoe body between the backing plate and the active surface of the brake shoe body so as to pass between and be wholly confined by the legs of the bracket, said reinforcing means including a plurality of horizontally disposed wire meshes, each of the legs of the bracket being provided with at least one aperture below the backing plate so that during the casting of the shoe the material of the body will flow through the apertures in the legs and in and around the wire mesh.

2. In a brake shoe structure, a brake shoe body, a supporting means therefor comprising a generally U-shaped bracket with a pair of depending legs mounted intermediate the ends of said body, a supporting plate within and extending the full length of the brake shoe body and adjacent the upper edge so as to pass between the legs of the bracket, said plate being provided with a pair of notches intermediate its ends between the legs of the bracket, each notch having approximately the same dimensions as a cross section of a bracket leg so that the legs of the bracket pass through and snugly fit in the notches in the plate, and reinforcing means extending the full length of the brake shoe body between the backing plate and the active surface of the brake shoe body so as to pass between and be confined by the legs of the bracket, said reinforcing means including a plurality of horizontally disposed wire meshes, each of the legs of the bracket being provided with at least one aperture therein and with a turned-in toe portion that is positioned below the level of the reinforcing wire meshes so that during the casting of the shoe the molten material of the body will flow through the apertures and the meshes and around the legs and their toes and the supporting plate to form a compact unitary supporting and reinforcing structure in the shoe body.

3. The structure of claim 1 in which the brake shoe body is provided with a plurality of longitudinal air passages disposed between the supporting plate and the active surface of the brake shoe body, the supporting plate extending beyond each end of the brake shoe body to function as a deflector for the passages for air flow, the passages being disposed within and passing through the reinforcing means.

4. The structure of claim 2 in which the brake shoe body is provided with a plurality of longitudinal air passages disposed between the supporting plate and the active surface of the brake shoe body, the supporting plate extending beyond each end of the brake shoe body to function as a deflector for the passages for air flow, the passages being disposed within and passing through the reinforcing means.

References Cited in the file of this patent

UNITED STATES PATENTS

| | | |
|---|---|---|
| 819,762 | Keefe | May 8, 1906 |
| 1,095,019 | Morse | Apr. 28, 1914 |
| 1,153,753 | Blue | Sept. 14, 1915 |
| 1,187,469 | Rowell | June 13, 1916 |
| 1,205,482 | Reid | Nov. 21, 1916 |
| 1,328,596 | Sargent | Jan. 20, 1920 |
| 1,402,116 | Thompson | Jan. 3, 1922 |
| 1,590,847 | Moore | June 29, 1926 |
| 1,916,387 | Pogue | July 4, 1933 |
| 1,921,836 | Pogue | Aug. 8, 1933 |
| 2,096,430 | Karr | Oct. 19, 1937 |